May 16, 1967  A. J. HUMPHREY  3,320,506
REFERENCE SYSTEM FOR CLOSED LOOP VARIABLE FREQUENCY DRIVE
Filed Oct. 10, 1963  4 Sheets-Sheet 1

INVENTOR.
ANDREW J. HUMPHREY
BY Woodling, Krost,
Granger and Rust
ATTORNEYS

INVENTOR.
ANDREW J. HUMPHREY
BY
ATTORNEYS

INVENTOR.
ANDREW J. HUMPHREY
BY
ATTORNEYS

United States Patent Office 3,320,506
Patented May 16, 1967

3,320,506
REFERENCE SYSTEM FOR CLOSED LOOP
VARIABLE FREQUENCY DRIVE
Andrew J. Humphrey, Cleveland, Ohio, assignor to The
Reliance Electric and Engineering Company, a corporation of Ohio
Filed Oct. 10, 1963, Ser. No. 315,261
29 Claims. (Cl. 318—231)

The invention relates in general to variable frequency control systems and more particularly to a variable speed motor control system which may be used with an induction motor for operation at a constant controlled or predetermined slip.

Induction motors, especially of the squirrel cage type, are inherently rugged and dependable, since no commutators, slip rings, or brushes need be used. However, the typical integral horsepower squirrel cage induction motor, even though widely used by industry, has the inherent disadvantages of essentially constant speed operation and relatively low starting torque with high starting currents. The starting torque is generally poor, as compared to the desirable characteristic of a D.C. series motor of higher starting than running torque and the usual starting current is about four or five times normal running current. Also the typical induction motor operates at an essentially constant speed which is below synchronous speed by the amount of the slip. Also, if attempts are made to increase the starting torque by using a higher resistance rotor, then this reduces the efficiency of the motor with consequent penalties during running operation.

Accordingly, it is an object of the present invention to provide a variable speed motor system which utilizes the rugged and reliable characteristics of a squirrel cage induction motor having a stationary stator winding, yet provides high starting torque and variable speed operation from zero to near synchronous speed together with high efficiency.

Another object of the invention is to provide a cycloconverter frequency changer controllable at constant or predetermined slip for energization of an induction motor.

Another object is to provide a variable output voltage and frequency cycloconverter for energizing a variable speed induction motor wherein constant torque may be obtained for all speeds and with frequency being controlled to hold and control the slip of the motor and the magnitude of the output voltage being controlled to control the speed.

Another object is to provide operation of a polyphase induction motor from a cycloconverter operated from a single phase power circuit for a simplified control system.

Another object is to provide a frequency changer energizing an induction motor with a composite of two signals, one in accordance with actual speed of the motor and the other in accordance with desired slip of the motor.

Another object is to provide a variable frequency changer controlling power flow to an induction motor for operation as either an induction motor or an induction generator with the frequency controlled in accordance with the series combination of first and second signals algebraically combined and with the first signal being in accordance with motor speed and the second signal being in accordance with desired slip of the motor, and the frequency of the combined signals controlling the torque direction of the generator or motor.

Another object is to provide a cycloconverter controlled polyphase induction motor energized from a polyphase source for variable speed operation and for operation as either an induction motor or induction generator.

Other objects and a fuller understanding of the invention may be had by referring to the following description and claims, taken in conjunction with the accompanying drawings, in which:

FIGURE 9 is a torque versus speed diagram; and,
FIGURES 10 through 16 are voltage and current diagrams illustrating the operation of the various modifications.

Figure 1:
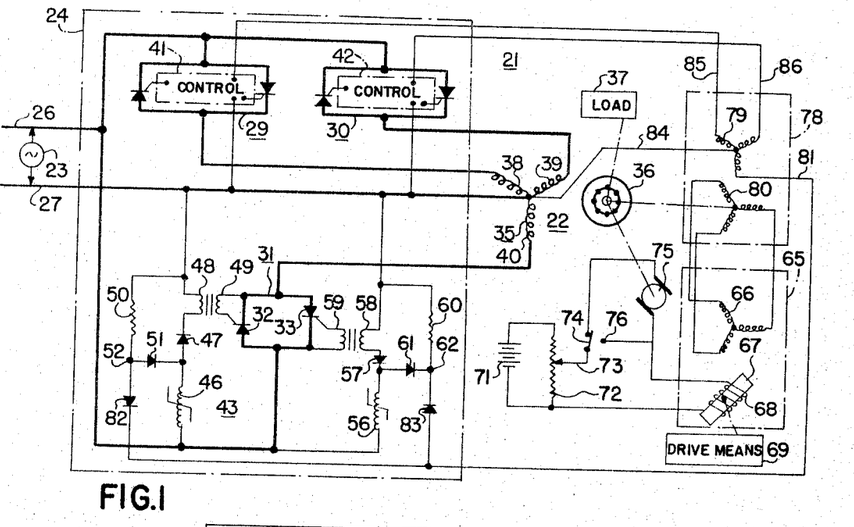
FIGURE 1 is a schematic diagram of one embodiment of the invention.

FIGURE 1 illustrates a motor control circuit 21 for controlling a motor 22 energized from a single phase voltage source 23 through a cycloconverter frequency changer 24. The voltage source 23 has lines 26 and 27 for energizing the cycloconverter 24. The cycloconverter 24 has first, second and third pairs of controllable rectifiers or unidirectional current conducting devices 29, 30 and 31, respectively. These may be solid state devices, for example, silicon controlled rectifiers.

The third pair of rectifiers 31 include controlled rectifiers 32 and 33. The motor 22 is shown as being an induction motor having a three phase stator winding 35 and a squirrel cage rotor 36. The rotor 36 drives a load 37 at a variable speed. The three phase stator 35 has first, second and third phase windings 38, 39 and 40, respectively, energized through the first, second and third pairs of rectifiers 29, 30 and 31, respectively. Control circuits 41, 42 and 43 are provided for the first, second and third pairs of rectifiers 29, 30 and 31, respectively. These control circuits 41–43 control the firing point of the controllable rectifiers. The control circuits 41 and 42 may be identical with the control circuit 43 and only this control circuit 43 is shown in detail.

The third control circuit 43 includes a saturable reactor winding 46, a diode 47 and a pluse transformer primary 48 connected in series from the first line 26 to the second line 27. A secondary 49 on the pulse transformer is connected to the gate and cathode of the first controlled rectifier 32 for supplying firing pulses thereto. A resistor 50 and a reset diode 51 are connected in series at a junction 52 and this series combination is connected to conduct current from the line 27 through the saturable reactor winding 46 to line 26. The polarity of the diodes 47 and 51 is such that when a positive voltage is impressed on the anode of the controlled rectifier 32 from line 26, a positive voltage is also impressed on the anode of the diode 47 so that both these paths are so poled as to be conductive. During the opposite half cycle, when the line 27 is positive relative to line 26, reset current may flow through the diode 51 to reset the saturable reactor winding 46. On the positive half cycles the point of collapse of the flux in the saturable reactor core 46 will depend upon the amount of reset in the preceding half cycle and will thus control the point at which substantial current is conducted through the saturable reactor winding 46 and through the pulse transformer 48 to supply a pulse to fire the controlled rectifier 32.

The controlled rectifier 33 has a similar connection of circuit elements in the control circuit 43 and includes a saturable reactor winding 56, a diode 57 and a pulse transformer primary 58 connected in series to conduct current from line 27 to line 26. A pulse transformer secondary 59 is connected to supply a pulse to the gate and cathode of the controlled rectifier 33 for firing same. A resistor 60 is connected in series with a reset diode 61 at a junction 62 to conduct current from line 26 through winding 56 to the line 27.

A slip generator 65 is an alternating current generator having a three phase stator winding 66 and a rotor 67 with a D.C. winding 68 thereon. The rotor 67 is driven from a drive means 69 at a slow speed which may be a constant speed or a predeterminable speed. This rotor 67 is driven at a slow speed in the order of one or one and a half revolutions per second and establishes a controlled amount of slip of the rotor 36 of the induction motor 22 relative to the rotating field in the three phase stator winding 35.

The D.C. rotor winding 68 is energized from a suitable D.C. source illustrated as a source 71 energizing a potentiometer 72 and a movable contact 73 on this potentiometer selects a certain portion of this D.C. source for variable energization of the rotor winding 68. The voltage from the movable contact 73 is supplied through a switch 74 and a feedback device illustrated as a D.C. tachometer 75 to the D.C. winding 68. Alternatively the switch blade may be moved to a contact 76 to disconnect the D.C. tachometer 75. This tachometer 75 is driven from the motor rotor 36.

A pilot generator 78 is an alternating current generator and may be a wound rotor induction machine having a three phase stator winding 79 and a three phase rotor winding 80. This rotor winding 80 is illustrated as being connected to the stator winding 66 of the slip generator 65, although it may be the stator winding 79 which is connected to the three phase stator winding 66 of the slip generator 65. A conductor 81 connects the outboard end of one of the windings of the three phase stator 79 to the third control circuit 43. A diode 82 is connected to conduct current from the junction 52 to the conductor 81 and a diode 83 is connected to conduct current from the conductor 81 to the junction 62. The three phase stator 79 is shown as being Y-connected and the neutral thereof is connected by a conductor 84 to the second line 27. Conductors 85 and 86 connect the outboard ends of the remaining phase windings of the stator 79 to the control circuits 41 and 42, respectively, for control thereof.

*Operation*

Figure 10:
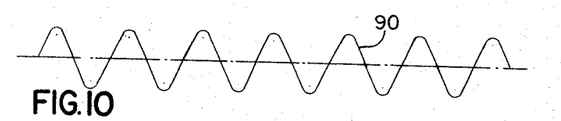
Figure 11:
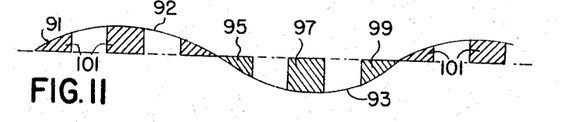
Figure 12:
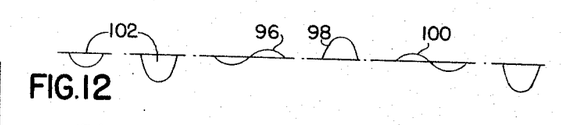

The operation of FIGURE 1 may be explained by referring to the voltage and current diagrams of FIGURES 10, 11 and 12. FIGURE 10 illustrates a voltage wave 90 which is the applied voltage from source 23 on the first line 26 relative to the second line 27. FIGURE 11 illustrates a control voltage 91 which is the voltage appearing on conductor 81 relative to conductor 84. This control voltage is shown as having a lower frequency than the line frequency and is shown as having a positive half cycle 92 and a negative half cycle 93. This control voltage 91 is shown as being about a 12-cycle voltage considering the line voltage as being 60 cycles. This lower frequency control voltage 91 is applied on conductors 81 and 84 to the cycloconverter frequency changer 24 to control the firing periods of the controlled rectifiers 32 and 33 and hence control the conduction through the third motor winding 40.

Assume that the rotor 67 is driven by the drive means at one revolution per second, this is a speed of one cycle per second. The D.C. energization of this rotor winding 68 provides a rotating field at one cycle per second and accordingly a one cycle per second voltage is supplied from the three phase stator winding 66. Assume that the motor rotor 36 is rotating at 11 cycles per second, or 11 revolutions per second on a two pole motor, then the rotor winding 80 is rotating at 11 revolutions per second. The combination of the one cycle rotating field electrically applied to the rotor winding 80 plus the 11 cycle rotating field mechanically applied by rotation of the rotor will generate a 12-cycle output voltage on the three phase stator winding 79. Accordingly, a 12-cycle single phase voltage is applied on conductor 81 relative to conductor 84. This is applied as a control voltage 91 to the cycloconverter 24.

When line 26 is positive relative to line 27, current may flow from line 26 through the saturable reactor winding 46, the diode 47 and the pulse transformer primary 48 to line 27. If this current is insufficient to collapse the flux in the core of the reactor 46, then an insufficient current is supplied to the pulse transformer 48 to fire the controlled rectifier 32. During the negative half cycle of the line voltage, current flows from line 27 through resistor 50, reset diode 51 and the reactor winding 46 to line 26. This resets the saturable reactor 46 completely or almost completely so that on the next positive half cycle of the line voltage when current flows through diode 47, there will be no pulse supplied through the pulse transformer 48 to the controlled rectifier 32. This is the normal condition providing complete reset of the reactor 46 so that no current is supplied to the motor stator 22.

However, the control voltage 91 provides controllable interference with this reset of the saturable reactor 46, which may be considered a magnetic amplifier when combined with the diodes 47 and 51. In FIGURE 11, there is shown the negative half cycle 93 of the control voltage 91. A portion 95 of this negative half cycle 93 is in phase with and of the same polarity as the negative half cycles of the line voltage 90. It is these negative half cycles of the line voltage 90 which provide the reset current through resistor 50 and reset diode 51 to reset the reactor 46. However, the portions 95 interfere with this reset because conductor 81 is negative at that instant relative to conductor 84. This means that current flows from the pilot generator winding 79 through conductor 84, line 27, resistor 50, diode 82 and conductor 81 to return to the stator winding 79. This current flow through resistor 50 provides a voltage drop thereacross which opposes or interferes with the normal reset current during negative half cycles of the line voltage 90 through resistor 50, diode 51 and reactor winding 46. Accordingly on the next positive half cycle of the line voltage 90, since the reactor winding 46 has not been completely reset, there will be a pulse supplied through pulse transformer 48 to fire the controlled rectifier 32 part-way through the positive half cycle and hence a pulse of current 96, FIGURE 12, will be supplied to the motor stator winding 40.

In the next negative half cycle of the line voltage 90, there is a portion 97 of the control voltage which is shown as being quite large and hence develops a large voltage across the resistor 50, which is positive at the upper end thereof, and this almost completely interferes with the reset of the reactor winding 46. Hence on the next positive half cycle of the line voltage, a large current pulse 98 is supplied to the motor winding 40. Similarly, a smaller voltage portion 99 of the control voltage 91 results in a smaller current pulse 100 supplied to the motor winding 40 on the next positive half cycle.

On the half cycles of the line voltage 90 wherein line 26 is negative relative to line 27, the polarity is correct to apply a positive anode voltage on the controlled rectifier 33. Accordingly, it is possible to fire this rectifier during these negative half cycles. Also these same negative half cycles provide current flow through the pulse transformer 58, diode 57 and saturable reactor winding 56 to fire the controlled rectifier 33, depending upon the amount of reset of the reactor winding 56 on the preceding half cycle. This reactor winding 56 will be reset during the positive half cycles of the line voltage 90. The positive half cycle 92 of the control voltage 91 will then provide voltage portions 101, FIGURE 11, which provide a variable amount of interference, through resistor 60, with the reset of the reactor winding 56 which normally takes place through reactor winding 56, reset diode 61 and resistor 60. These voltage portions 101 thus provide controlled current pulses 102, FIGURE 12, through the controllable rectifier 33 and through motor winding 40. These, of course, are current pulses in the opposite direction to those provided by the controllable rectifier 32.

The positive half cycle 92 of the control voltage 91 is of the wrong polarity to interfere with the reset of the reactor winding 46, hence, there are no current pulses through the controllable rectifier 32 during this positive half cycle 92. Similarly, the negative half cycle 93 of the control voltage 91 is of the wrong polarity to interfere with the reset of the reactor winding 56, hence there are no current pulses through the controllable rectifier 33 during this negative half cycle 93.

FIGURE 12 shows the current pulses supplied to the motor winding 40 and the envelope of these current pulses is a 12 cycle wave. The control circuits 41 and 42 for the other two pairs of recifiers 29 and 30 are also supplied with this same 12 cycle control voltage. The phases of each of these 12 cycle waves are displaced 120 degrees apart so that the period of maximum amplitudes of the current pulses supplied through the pairs of rectifiers 29 and 30 are displaced 120 degrees plus and minus relative to the current pulses through the pair of rectifiers 31. Accordingly this provides an electrically rotating field at a 12 cycle rate in the motor stator winding 35. This means that the motor rotor 36 will rotate at a speed in accordance with this 12 cycle rotating field and in the above example will rotate with a one cycle slip to rotate at a speed of 11 revolutions per second, assuming a two pole motor. This provides the proper rotational speed of the pilot generator rotor 80 to maintain the aforesaid conditions.

Assume that the motor is at rest and that the switch 74 is moved to contact the contact 76, thus cutting the tachometer 75 out of the circuit. The rest condition of the motor would be with the potentiometer blade 73 at the bottom so that no D.C. voltage is applied to the rotor winding 68. The movable blade 73 is a speed and torque controlling device and as this movable blade is moved upwardly to increasingly energize the rotor winding 68, and as the drive means 69 causes the rotor 67 to rotate, for example, at one revolution per second, a one cycle voltage of increasing amplitude will be generated in the stator winding 66 and in the rotor winding 80. Accordingly, this generates a one cycle voltage in the stator winding 79 and hence a one cycle voltage is applied to control the cycloconverter 24. Accordingly, a one cycle rotating field is generated by the controlled rectifiers 29–31 in the motor stator 35 and this will provide starting torque to the rotor 36. Accordingly, the motor is starting under a condition which is similar to the normal running condition of the usual induction motor, namely, it has only one cycle slip between the rotor speed and the speed of the rotating field. The usual starting condition of an induction motor is with a full 60 cycle slip assuming 60 cycle energization on the stator winding. Accordingly, the motor is starting under favorable torque versus speed conditions and is starting well up on the speed-torque curve. This permits use of a very low resistance rotor and still obtains high starting torque without resorting to a high resistance rotor to obtain high starting torque. Since a very low resistance rotor may be used, this provides low losses in the rotor at all speeds and hence high efficiency of operation.

As the motor accelerates, the torque taken by the load will also increase and a point of balance will be reached for a given setting of the potentiometer blade 73 at which the motor output torque matches the torque requirements of the load 37 and the motor rotor 36 will then run at this speed. This speed will, of course, rotate the rotor winding 80 so that the combination of the slip speed set by the drive means 69 plus the rotor rotational speed set in the rotor winding 80 will provide a control voltage from the stator winding 79 at the proper frequency to operate the cycloconverter 24 to maintain the aforesaid speed of the rotor 36. If the torque of the load 37 should increase for any reason, the speed of the rotor 36 will decrease to a point whereat the torque output, as set by the movable potentiometer blade 73, equals the torque requirement of the load 37.

As the switch 74 is moved to the position shown in FIGURE 1, then the D.C. tachometer 75 is connected in the circuit and it is connected so that the voltage thereof opposes but is normally less than the reference voltage from the potentiometer 72. Thus it is the difference of these two D.C. voltages which is applied to the rotor winding 68 for control purposes. Then as the motor slows down under increasing torque requirements of the load 37, the D.C. voltage from tachometer 75 will decrease to increase the voltage applied to the rotor winding 68. This increases the amplitude of the control voltage from the stator winding 79, increases the interference with reset of the magnetic amplifiers, and increases amplitude of the current pulses supplied to the motor stator 35 to increase the torque output of the rotor 36. Thus this feedback from tachometer 75 provides a stable system compensating for torque variation in the load to maintain substantially constant speed at a constant slip determined by the drive means 69.

In all of the control circuits shown, other methods of firing the controlled rectifiers are possible, although for simplicity, all figures have shown the use of reset magnetic amplifiers.

Figure 2:
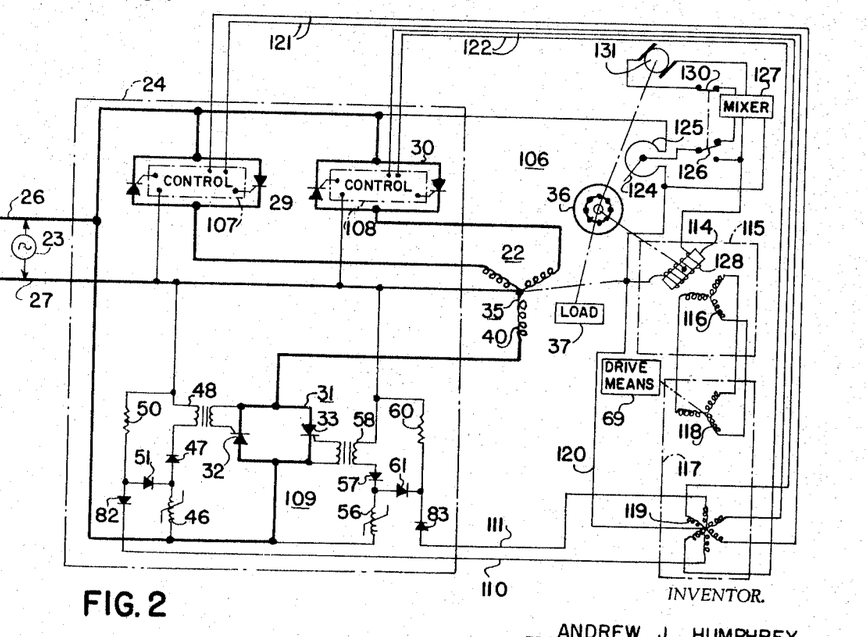
FIGURE 2 is a schematic diagram of the preferred embodiment of the invention.

FIGURE 2 shows a motor control circuit 106 for energizing the motor 22 for variable speed. The cycloconverter 24 again includes first, second and third pairs of rectifiers 29, 30 and 31, respectively, and these pairs of rectifiers are controlled by control circuits 107, 108 and 109, respectively. These three control circuits may be identical and control circuit 109 is the only one showing the actual circuit elements. This control circuit 109 may be identical to the control circuit 43 of FIGURE 1 except that two separate conductors 110 and 111 are provided with conductor 110 connected to the diode 82 and conductor 111 connected to the diode 83.

The motor rotor 36 drives a rotor 114 of a pilot generator 115 which has a three phase stator winding 116. A slip generator 117 has a rotor winding 118 which is rotated at a low speed by the drive means 69. The slip generator 117 has a six phase stator winding 119 formed from three center tapped windings in a star connection. The neutral of this six phase stator winding is connected by a conductor 120 to the line 27. Conductors 110 and 111 are connected to opposite ends of one of the three phase windings in the stator winding 119. The remaining two of the three windings are connected by pairs of conductors 121 and 122 to the control circuits 107 and 108, respectively.

A 60 cycle reference voltage is obtained from a movable blade 124 of a potentiometer 125 which is connected across the first and second lines 26 and 27. Voltage from the movable blade 124 is applied through a double throw switch 126 either to a mixer 127 or directly to a single phase winding 128 on the pilot generator rotor 114. A switch 130 is linked to be operated with switch 126 and connects or disconnects from the circuit a direct current tachometer 131 which is driven from the motor rotor 36. When the switch 130 is closed, the voltage from the direct current tachometer is applied to the mixer 127 to control the amplitude of the reference voltage obtained from the movable blade 124 to be applied to the rotor winding 128.

*Operation*

The operation of the circuit 106 of FIGURE 2 may be considered with the direct current tachometer 131 connected in the circuit with switch 130 closed and the switch 126 supplying the variable reference voltage to the mixer 127. The amplitude of the voltage fed from the mixer 127 to the rotor winding 128 is inversely proportional to the feedback voltage from the direct current tachometer 131. This 60 cycle reference voltage is supplied to the rotor winding 128 and assuming that this rotor is rotating at a speed of 11 cycles per second, then there will be generated in the stator winding 116 a 60 cycle single phase voltage amplitude modulated at 11 cycles per second. There are three different coils making up the stator winding 116 but this is not a three phase voltage generated in these three coils, rather it is a single phase voltage with the amplitude modulation on each of these three coils displaced 120 degrees in phase. This 60 cycle voltage amplitude modulated at 11 cycles per second as applied to the rotor winding 118 of the slip generator 117. Assuming that the drive means 69 is rotating at one revolution per second, then this combination of mechanical and electrical rotation generates in the stator winding 119 a 60 cycle voltage amplitude modulated at 12 cycles per second. Again, this is a single phase voltage with the three center tapped coils of the winding 119 each having the periods of maximum amplitude of the amplitude modulated wave displaced 120 degrees in phase. This is the control voltage which is supplied to the control circuits 107, 108 and 109 to control the firing time of the rectifiers in the cycloconverter 24.

Figure 13:
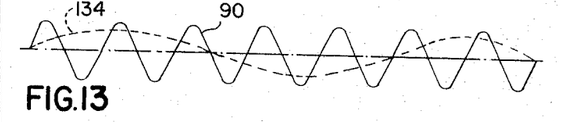
Figure 14:
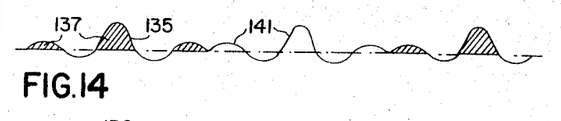
Figure 15:
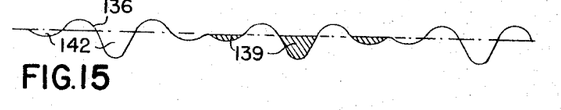

FIGURES 13–16 illustrate voltage and current waves for this motor control circuit 106 of FIGURE 2. FIGURE 13 illustrates the line voltage 90 as in FIGURE 10. Additionally, a voltage 134 is shown as a 12 cycle wave. This 12 cycle voltage actually does not appear anywhere in the circuit of FIGURE 2 but illustrates the 12 cycle component of the 60 cycle single phase 12 cycle amplitude modulated control voltage. FIGURE 14 illustrates the control voltage 135 which is the 60 cycle amplitude modulated wave appearing on conductor 111 relative to conductor 120. FIGURE 15 shows the control voltage 136 which is the inverse of control voltage 135 and is the 60 cycle amplitude modulated wave appearing on conductor 110 relative to conductor 120. Considering first the control voltage 135 shown in FIGURE 14, when this voltage goes positive, as in portions 137, at the same time that the line 26 goes positive, then this control voltage 135 will interfere with the reset of the saturable reactor 56 because of the current flow through the resistor 60. Accordingly, in the next half cycle when line 26 is negative, current will flow through the saturable reactor 56 to supply a pulse through pulse transformer 58 and fire rectifier 33 at a time in that negative half cycle dependent upon the amount of previous reset of the reactor 56. This will supply pulses of current 138, shown in FIGURE 16, through the controlled rectifier 33 to the motor winding 40.

Figures 9, 16:
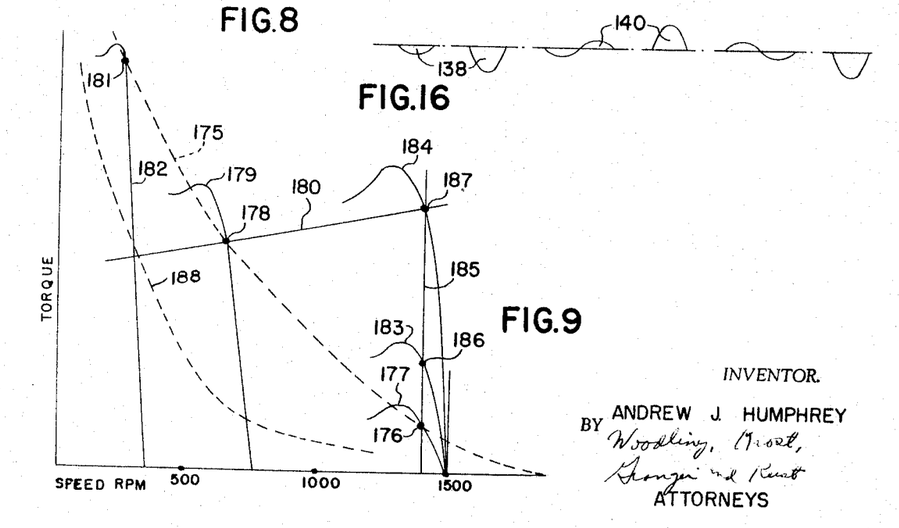

Considering the control voltage 136 shown in FIGURE 15, portions 139 of this control voltage are shown as being negative at the same time that the line voltage 26 is negative. This will cause current flow through the resistor 50 which will interfere with the reset of the saturable reactor 46 and, accordingly, in the next half cycles when line 26 is positive, the controlled rectifier 32 will be controlled in conduction to supply current pulses 140 to the motor winding 40. In FIGURE 14 there are shown voltage portions 141 which are positive but these occur during the half cycles of the line voltage 26 when this line voltage is negative hence they are in the wrong phase to provide any reset interference on the saturable reactor 56. Accordingly, there is no current conduction through the controlled rectifier 33 during this negative half cycle of the voltage 134 as illustrated in FIGURE 13. Also FIGURE 15 shows portions 142 which are negative but these provide no interference to reset of the saturable reactor 46 because they are of the wrong phase relative to the line voltage 90 and accordingly there is no current conduction through the controlled rectifier 32 during the positive half cycle of the positive voltage 134 shown in FIGURE 13. The FIGURE 16 shows the current pulses 138 and 140 which are supplied to the motor winding 40 and the envelope of these current pulses is a 12 cycle wave.

The above description assumes a constant speed of 11 revolutions per second of the rotor 36 with a one cycle slip as determined by the drive means 69. If the direct current tachometer or feedback means 131 is disconnected from the circuit by opening switch 130, then the speed of the motor rotor 36 is controlled by the position of the potentiometer blade 124 and the torque requirements of the load 37. With the feedback means 131 in the circuit, increased torque requirements of the load 37 will cause the motor 36 to tend to slow down which decreases the voltage feedback and increases the reference voltage supplied to the rotor winding 128. This will be an increased amplitude and will result in an increased amplitude of the 60 cycle amplitude modulated wave developed at the stator winding 119. This will increasingly interfere with the reset of the magnetic amplifiers to increase the current pulses to the stator winding 35 to thus increase the torque output of the motor 22.

FIGURE 2 shows that the reference voltage is supplied to the pilot generator 115 and the voltage therefrom is supplied to the slip generator 117 and from there to control the cycloconverter 24. This is an opposite series path to the path shown in FIGURE 1 and illustrates that the control voltage may start either at the slip generator or at the pilot generator.

Figure 3:
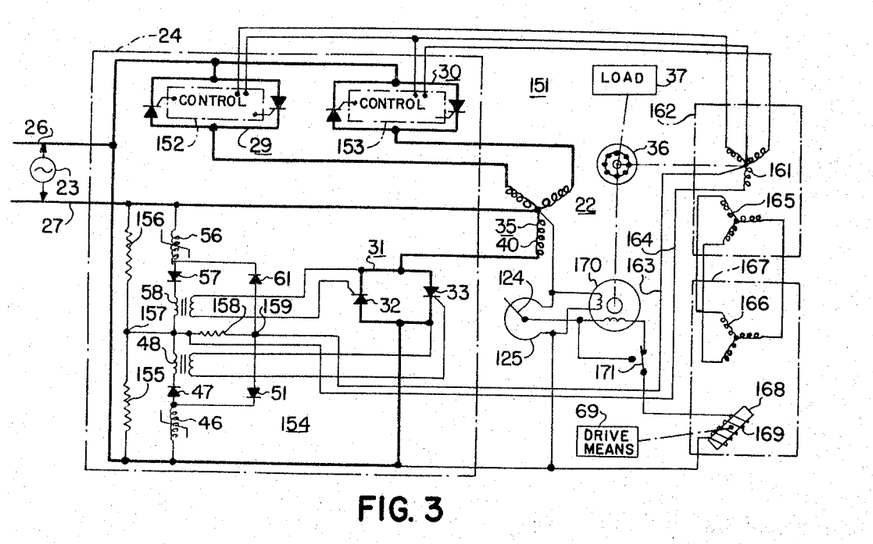
FIGURE 3 is a schematic diagram of another modification.

FIGURE 3 shows a motor control circuit 151 for controlling the motor 22 from the voltage source 23. The cycloconverter 24 is controlled by control circuits 152, 153 and 154 which may be identical and control circuit 154 is shown in detail. A voltage divider is established by resistors 155 and 156 connected between lines 26 and 27 to establish a voltage neutral junction 157. This voltage neutral junction may also be established by a transformer winding if desired. The first saturable reactor winding 46, diode 47 and pulse transformer primary 48 are connected in series to conduct current from line 26 to the junction 157. The saturable reactor winding 56, diode 57 and pulse transformer primary 58 are connected in series to conduct current from the line 27 to the junction 157. A control signal impedance shown as a resistor 158 is connected between junction 157 and a junction 159. The reset diode 51 is connected to conduct current from the junction 159 through the saturable reactor 46 to line 26. The reset diode 61 is connected to conduct current from the junction 159 through the saturable reactor 56 to line 27.

The motor rotor 36 drives the rotor 161 of a pilot generator 162. This rotor 161 has windings displaced 120 degrees in phase. The neutral of this winding 161 is connected by a conductor 163 to the junction 159 and the outboard end of one of the windings 161 is connected by a conductor 164 to the junction 157. The outer ends of the two remaining windings of the rotor winding 161 are connected to the other control circuits 152 and 153 for control thereof.

The pilot generator 162 has a three phase stator winding 165 connected to a three phase stator winding 166 of a slip generator 167. This generator has a rotor 168 carrying a single phase rotor winding 169 one end of which is connected to the potentiometer 125 which establishes a reference voltage source. This potentiometer 125 is connected across lines 26 and 27 to have line voltage impressed thereon. The movable blade 124 of this potentiometer 125 supplies the variable amplitude of reference voltage and is connected through a feedback means 170 and through a switch 171 to the upper end of the rotor winding 169. The feedback means 170 is an alternating current generator and may be in the form of a drag cup tachometer which has the characteristics of providing variable amplitude of alternating current voltage at a constant frequency and constant phase. In this case 60 cycle voltage is assumed to be impressed on this tachometer 170 and increasing speed of the tachometer 170 increases the amplitude of the 60 cycle voltage generated thereby. The voltage of the tachometer opposes but is less than the reference voltage, so that the difference therebetween is applied to winding 169.

Operation

The motor control circuit 151 of FIGURE 3 operates in a manner similar to the circuit of FIGURE 2. The drive means 69 provides a slow speed rotation to establish a controlled slip speed for the operation of the motor 22. Assuming that this is about one or one and a half cycles per second, the stator 166 of the slip generator 167 supplies a 60 cycle voltage amplitude modulated at this slip frequency of, for example, one cycle per second. This voltage is applied to the stator winding 165 of the pilot generator 162. If it is assumed that the rotor 36 is rotating at a preset speed, for example, at 11 revolutions per second, then the combination of the electrical rotation and mechanical rotation will establish a voltage generated in the rotor winding 161 which is a 60 cycle voltage amplitude modulated at 12 cycles per second. This voltage is applied by conductors 163 and 164 across the resistor 158. This is a control signal resistor which establishes the amount and phase of the reset interference current to interfere selectively with the resetting of the saturable reactors 46 and 56 to control the firing pulses of the controlled rectifiers 32 and 33. The line voltage again may be shown by a curve 90 in FIGURE 13 and the 12 cycle component of the control voltage is the wave 134 shown in FIGURE 13. The control voltage developed across the resistor 158 will be the same shape as the control voltage 135 in FIGURE 14 but there will not be the inverse control voltage as shown in FIGURE 15. Since reset current for the two reactors 46 and 56 pass through the control signal resistor 158 and through either the reset diode 51 or 61, the only time that there will be interference with reset current is during those half cycles of the control voltage when junction 157 is positive relative to junction 159. This means that the voltage portions 141, FIGURE 14, being in phase with negative half cycles of voltage on line 26, will interfere with the reset of the saturable reactor 46 and will thus cause current pulses 140, FIGURE 16, through the controlled rectifier 32. The voltage portions 137 of the control voltage 135 in FIGURE 14 are positive when the voltage on line 26 is positive and hence will interfere with the reset of the saturable reactor 56 to thus cause current pulses 138, FIGURE 16, through the controlled rectifier 33. Accordingly, the FIGURE 16 shows the current pulses that will be obtained by this control system of FIGURE 3.

The motor control circuit 151 of FIGURE 3 may be operated with or without the feedback tachometer 170. If the switch 171 is moved to the left to disconnect the tachometer 170, then the potentiometer 124 is a torque/speed setting device which will establish a certain value of amplitude from the pilot generator 162 to establish a certain amplitude of current pulses to the motor winding 35. This will operate the motor 36 at a particular torque output, but as the speed rises the volts per cycle applied to the motor go down, thus reducing the torque level until the load torque matches the motor torque. If the switch 171 is moved to the right to the position shown, then the feedback tachometer 170 is connected in the circuit and increases the voltage to the rotor winding 169 when the motor slows down. The potentiometer 125 thus becomes a speed control device to hold essentially constant speed of the motor regardless of the torque requirements of the load.

FIGURE 9 illustrates curves of torque versus speed for various operating conditions of the motor 22. If the systems of FIGURES 1, 2 and 3 are operated as open loop systems, that is, without feedback, then the operating point of the motor is along a curve 175 which is a locus of constant slip fixed reference voltage speed-torque curves for a given voltage. If the torque requirements of the load 37 are low, then the motor will operate at a point 176 on a curve 177 of torque versus speed. If the torque requirements of the load 37 increase, then the speed will decrease and the motor will operate at a point 178 on a curve 179. A line 180 representing a typical torque load curve intersects the curve 179 to establish the point 178 which is the operating point of the motor 22. If the load torque requirements increase still further, the operating point of the motor will move still further to a point 181 on a curve 182 with still higher torque at still lower speed. Thus this curve 175 shows the locus of the operating point for a fixed reference voltage such as from the reference potentiometer 125. This curve 175 is nearly a constant horsepower curve. A curve 188 is a locus of a constant slip fixed reference voltage torque-speed curves for a lower applied reference voltage. There will be a whole family of such curves 175 and 188 depending upon the applied reference voltage.

If the motor control circuits of FIGURES 1, 2 and 3 are operated as closed loop systems, that is with the feedback tachometers connected in the circuit, then curves 177, 183 and 184 will apply. For load torque requirements at a preset speed, curve 177 will apply with the operating point being at point 176. This is assuming a synchronous speed of 1500 r.p.m. which might be the case with a two-pole motor operating at 25 cycles from a 60 cycle source through the cycloconverter 24. The 1500 r.p.m. synchronous speed is set by the effective envelope of the current curve supplied to the stator winding 35 of the motor 22. The actual operating speed of the motor rotor 36 will be as determined by the amount of slip set by the drive means 69. This will be on a locus 185. If the load torque requirements increase, the feedback means will increase the control voltage to a curve 183 and an operating point 186, for example, or if the load requirements increase still further, the feedback means will increase the control voltage still further to establish the operating point on curve 184 at point 187, for example. This has been made to coincide with the torque load curve 180 to illustrate that a particular load torque curve 180 may be accommodated by either the open loop system or the closed loop feedback system and at any desired speed from zero to near synchronous speed of the line.

The FIGURES 1, 2 and 3 show various combinations for obtaining the control voltage. In the above illustrations it has been assumed that the control voltage has been 12 cycles. This, of course, is merely illustrative and this control voltage may be anything from zero to 60 cycles. The means to obtain this control voltage has been shown as being the combination of a pilot generator and a slip generator and these are illustrative of means to combine two different signals. The first signal is a low frequency signal, such as one or one-and-a-half cycles, to establish the slip of the motor, and the other signal is derived from the actual motor speed. A combination machine having two rotatable members may be used in place of the separate slip and pilot generator or a static form of generator may be used to combine the signals for the desired slip and for the actual speed of the motor. It will be noted that these three motor control systems of FIGURES 1, 2 and 3 actually supply two signals, one is frequency and one is magnitude of the voltage. The frequency is the frequency corresponding to rotor speed plus the frequency of the desired or controlled slip. The voltage magnitude controls the current or power output of the cycloconverter to control the torque and speed of the main motor 22.

In the aforementioned explanation, it has been assumed that the induction machine 22 has been operating as an induction motor. If one wishes to operate the unit as an induction generator, the controlled slip frequency from the drive means 69 is merely reversed from an additive to a subtractive value and this places the operation in the other two quarters of the speed torque diagram. The direction of rotation of the slip generator may be reversed and the constant slip of the motor will be reversed from its previous direction with the result that the torque will be reversed. If the motor is driven in the forward direction, for example, by an overhauling load, the result will be a controlled return of power to the power lines 26 and 27 through the cycloconverter 24. Hence, merely by reversing the drive means 69 or the direction of rotation or the phase of the output slip generator, a reversing drive will be provided.

Figure 4:
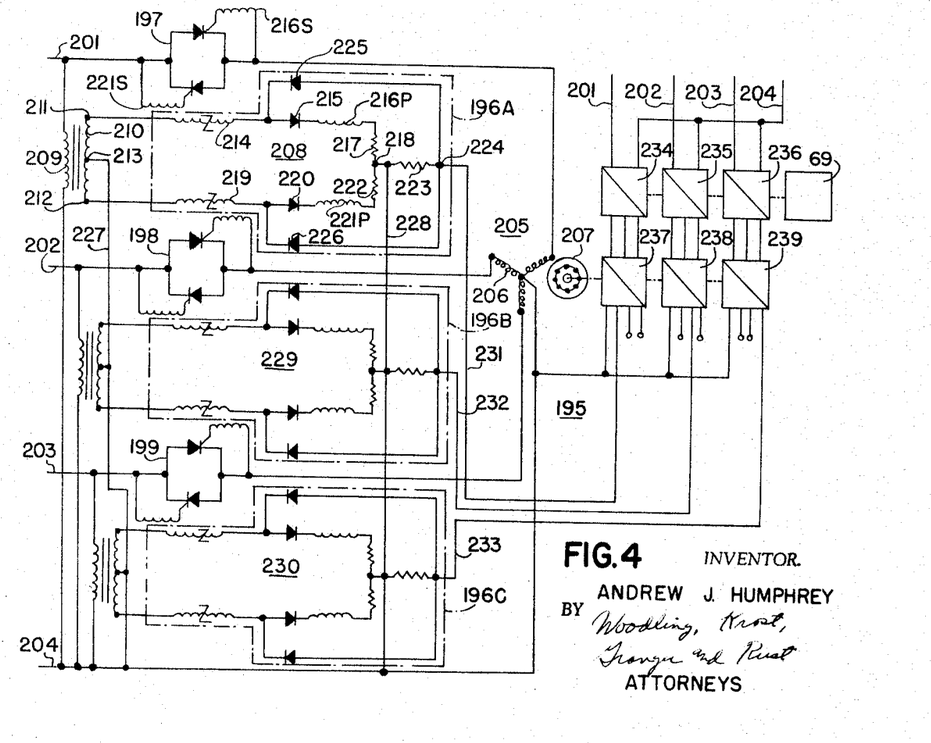
FIGURES 4 through 8 are schematic diagrams of polyphase variations of the invention.

FIGURE 4 shows a motor control circuit 195 for a three phase to three phase cycloconverter 196 which has been shown as being in three parts, 196A, B and C, to control first, second and third pairs 197, 198 and 199 of controlled rectifiers. The motor control circuit 195 is for use with a three phase source having first, second and third lines 201, 202 and 203, respectively, and a neutral line 204. The energization from the cycloconverter 196 is supplied to a three phase motor 205 having a three phase stator winding 206 and a rotor 207. The three different phase windings of the stator winding 206 are connected through the first, second and third pairs of rectifiers 197, 198 and 199 to the lines 201, 202 and 203, respectively, and the neutral of the stator winding 206 is connected to the neutral line 204. Only the cycloconverter section 196A is shown with reference numerals but the other two sections 196B and 196C may be identical therewith. A transformer 209 is connected between the first line 201 and the neutral line 204 and has a secondary 210 for energizing the cycloconverter section 196A. This secondary 210 has end terminals 211 and 212 and a mid-tap 213. A saturable reactor winding 214, a diode 215, a pulse transformer primary 216P and a resistor 217 are connected in series between end terminal 211 and a junction 218. Another series path extends from terminal 212 to terminal 218 and includes a saturable reactor winding 219, a diode 220, a pulse transformer primary 221P and a resistor 222. A control signal resistor 223 is connected between the junction terminal 218 and a terminal 224. A reset diode 225 is connected between terminal 224 and the junction of diode 215 and saturable reactor 214 to conduct reset current through the saturable reactor winding 214. Similarly, a reset diode 226 is connected between the terminal 224 and the junction of reactor winding 219 and diode 220 to conduct reset current through the saturable reactor winding 219. A conductor 227 interconnects the midtaps of all the energizing transformers such as transformer secondary 210 and a conductor 228 interconnects all of the terminals similar to terminal 218 in the cycloconverter section 196A. The conductor 227 and conductor 228 extend to the neutral line 224 and, hence the terminals 213 and 218 are interconnected. The secondaries of the pulse transformers 216S and 221S are shown as being connected to the gate and cathode of the first pair of controlled rectifiers 197, to control the firing thereof.

The control signal is applied across the control signal resistor 223 from a conductor 231, and conductors 232 and 233 extend to similar resistors in the cycloconverter sections 196B and C, respectively.

The control signal supplied to the resistor 223 is derived from slip generators 234, 235 and 236 and from pilot generators 237, 238 and 239. The slip generators 234, 235 and 236 are driven from the drive means 69 at a low speed and each has a single phase input and a three phase output. They are shown schematically as a block with a line separating their movable and stationary elements. Either the input or the output may be the rotor of these machines and they are synchros or wound rotor induction machines. The single phase inputs to these generators are obtained from lines 201, 202 and 203 and the neutral line 204 with a different phase energizing each of the three slip generators 234, 235 and 236. The diagonal line through each of these slip generators indicates they are all wound in the same direction.

The three phase output from these slip generators is supplied to the inputs of the pilot generators 237, 238 and 239. The output of each pilot generator is single phase, but the output of each is mechanically displaced 120 degrees from the other two pilot generators. In order to avoid careful mechanical alignment of these three output windings, the output windings conveniently may be three phase and then a differently phased single phase voltage is selected from each of the three pilot generator outputs as shown. Accordingly, the other two phase windings in each of the pilot generators 237, 238 and 239 is not connected. The conductor 231 is connected to the pilot generator 237, conductor 232 is connected to the pilot generator 238 and conductor 233 is connected to the pilot generator 239.

*Operation*

The circuit 195 of FIGURE 4 operates in a manner somewhat similar to the single phase circuits of FIGURES 1, 2 and 3. Considering first the slip generator 234 and pilot generator 237, for the control of the cycloconverter section 196A, it will be observed that this is similar to the control of the circuit of FIGURE 2. Assume that the drive means 69 is rotating at one cycle per second and that the rotor of the pilot generators 237 is rotating at a speed in accordance with 20 cycles per second. This means that a 60 cycle, single phase energization supplied to the input of the slip generator 234 will be changed into a sixty cycle voltage amplitude modulated at one cycle per second on the output of this slip generator 234. The phase of modulation will be determined by the winding orientation in the machine. Upon passing through the pilot generator 237 and being affected by the mechanical rotation at twenty cycles per second, the output voltage of the pilot generator 237 will be a sixty cycle single phase voltage amplitude modulated at 21 cycles per second. Only a particular phase of the amplitude modulated voltage is used on the output and this controls the firing of the controlled rectifier pair 197. Firing pulses are supplied to the pulse transformer 216P by conduction through the saturable reactor winding 214 and the diode 215. On the opposite half cycle of the line voltage, the saturable reactor winding 214 is reset through the reset diode 225. This reset path includes the control signal resistor 223 and will make the left end of this resistor 223 positive.

The signal from the pilot generator 237 on line 231 will be a 60 cycle voltage amplitude modulated at the frequency of the control signal. In the above mentioned example, this would be a 21 cycle amplitude modulation. This would be a voltage somewhat similar to the control voltage 135 shown in FIGURE 14. On the positive cycles of this control voltage, there will be a controlled amount of interference with the reset of the saturable reactor 214 or with the reset of the saturable reactor 219, depending upon the polarity of the line voltage and, thus, FIGURES 13, 14 and 16 generally indicate the control effected by the cycloconverter section 196A. The current supplied to the motor phase winding of the stator 206 will be similar to those current pulses shown in FIGURE 16.

The remaining pilot generators 238 and 239 will also supply a 60 cycle single phase voltage amplitude modulated at the control signal frequency to the other two cycloconverter sections 196B and C, but with the maximum amplitude of the amplitude modulation phase shifted by 120 degrees plus and minus relative to the signal on the conductor 231. This will control the cycloconverter sections 196B and 196C so that the envelope of the current pulses supplied to the phase windings of the motor stator 206 will also be shifted 120 degrees plus and minus of the envelope of the current pulses supplied by the cycloconverter section 196A. Accordingly, a three phase current is supplied to the motor winding 206 at the control frequency. This will be a 21 cycle frequency as recited in the above example and therefore the motor rotor 207 will rotate at this aforesaid frequency of 20 cycles per second, assuming a two pole motor winding is used.

Figure 5:
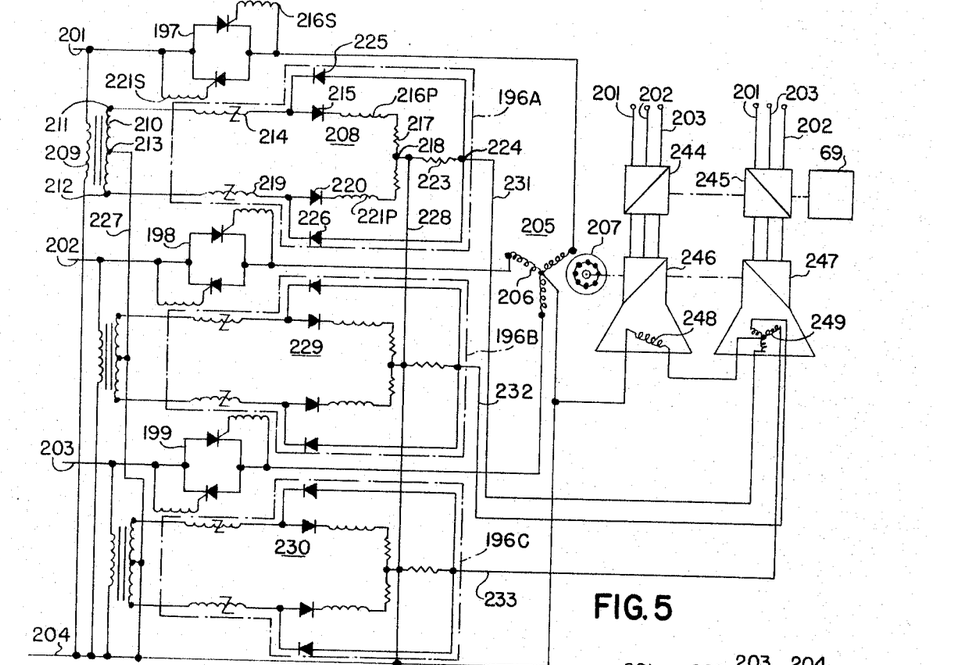

FIGURE 5 shows the same cycloconverter system 196 for energizing the motor 205 as FIGURE 4. Thus, the left half of FIGURES 4 and 5 are the same.

In FIGURE 5, the control signal for the cycloconverter 196 is generated in slip generators 244 and 245 and pilot generators 246 and 247. The slip generators 244 and 245 are driven from the drive means 69 at a low slip speed and each has a three phase rotor and a three phase stator and each may be a synchro-type machine or a wound rotor induction machine. The input may be either to the rotor or to the stator and the input is connected to the lines 201, 202 and 203. The input to the slip generator 245 is of the opposite phase relationship to the slip generator 244. The three phase output from the slip generators 244 and 245 is supplied to the pilot generators 246 and 247, respectively. The slip generator 246 has a three phase input and a single phase output from a winding 248. The pilot generator 247 has a three phase input and a three phase output from a winding 249. One end of the winding 248 is connected to the neutral line 204 and the other end is connected to the neutral of the three phase winding 249. The conductors 231, 232 and 233 are connected to the outboard ends of the three windings of the three phase winding 249.

It is possible to have the phase sequence of the three phase 60 cycle voltage such that it tends to make the motor rotate in the direction where most of the operation is required and this tends to enhance the forward torque of the motor by virtue of the power line frequency component introduced. By bringing the phasing of the controls over further as speed is increased, one may smoothly translate from a low frequency operation to a 60 cycle controlled voltage operation and obtain a very wide speed range of operation. The deviation in the amplitude modulated signals from the slip generators and the pilot generators from a perfect signal tends to allow this transformation to be made smoothly.

*Operation*

The motor control circuit 195 of the circuit of FIGURE 5 operates in a manner similar to the single phase versions of FIGURES 1, 2 and 3. Assume that a level of 60 cycle excitation is applied to lines 201, 202 and 203, that the drive means 69 is rotating at one cycle per second and that the rotor 207 is rotating at a speed corresponding to twenty cycles per second. The slip generators 244 and 245 are energized for opposite phase rotation and assuming that the electrical phase rotation and mechanical rotation in the slip generator 244 is additive, then the sixty cycle, three phase energization of the input of the slip generator 244 will be changed to 61 cycles, three phase voltage on the output of the slip generator 244. If the mechanical rotation from the winding 248 is also additive, then this will be an 81 cycle, single phase voltage as supplied at the output of the winding 248. Since the slip generator 248 establishes additive voltage conditions, the slip generator 245 will establish subtractive voltage conditions. Accordingly, the sixty cycle, three phase voltage supplied to the input of the slip generator 245 will result in a 59 cycle, three phase voltage on the output of this slip genertaor 245. The twenty cycle subtractive rotation of the winding 249 will result in a 39 cycle, three phase voltage on the output of this pilot generator winding 249.

The series connection of the windings 248 and 249 will produce a sixty cycle voltage which on each of the phase windings of winding 249 is single phase and amplitude modulated at the control frequency. In the above example, this control frequency is 21 cycles per second. The reason this mixture of 81 cycle frequency and 39 cycle frequency voltages obtains a 60 cycle voltage amplitude modulated at 21 cycles is in accordance with the rules of trigonometry. This motor control circuit mixes together the sixty cycle and 21 cycle voltages in the following manner:

$$\sin(a+b) + \sin(a-b) = 2\sin\frac{a+b}{2}\cos\frac{a-b}{2}$$

In this equation, the amplitudes of the two quantities $a-b$ and $a+b$ should be the same. It will be observed that a cosine wave is similar to a sine wave but merely displaced by 90 degrees. Accordingly, what is obtained is a wave which is a 60 cycle voltage amplitude modulated at the 21 cycle control voltage frequency.

Any convenient means may be used to control the amplitude of the input voltage on the slip generators 234 or 235 to obtain equality of the amplitude of the quantities $a-b$ and $a+b$. In an actual synchro or wound rotor induction machine, as long as the speed is near standstill, these two amplitudes are approximately equal, but as the speed deviates from standstill, a greater deviation of amplitude of the two signals is created. The amplitude difference may be corrected by varying the amplitude of the input voltage or by correcting specifically for a desired speed range by using initially a larger voltage on one slip generator than on the other.

In the conductor 231, the 60 cycle carrier will have a phase of zero degrees and an amplitude modulation phase of zero degrees relative to the first line 201. The voltage on conductor 232 will have a carrier phase of 120 degrees and an amplitude modulation phase of 120 degrees relative to this first line 201, and similarly, the voltage on the third conductor 233 will have a carrier phase of 240 degrees and an amplitude modulation phase of 240 degrees relative to this first line 201. The reason for this is because each conductor 231, 232 and 233 is connected to a different phase winding of the three phase pilot generator 249.

The control voltage on each of the cycloconverter sections 196A, B and C is then like the control voltage 135 shown in FIGURE 14. This will control the firing of each of the pairs of rectifiers 197, 198 and 199 to supply a group of current pulses to the respective motor phase winding at the control frequency. In the above example, this has been at a frequency of 21 cycles per second. Each of these envelopes of current pulses will have the maximum amplitude thereof displaced in phase 120 degrees relative to the other two phases so that a rotating field at the 21 cycle rate is supplied to the motor stator winding 206 and this will rotate the rotor 207 at the aforementioned 20 cycle rate.

In FIGURES 4 and 5, the control of the speed and torque has not been shown but this again may be accomplished by systems similar to those shown in FIGURES 1, 2 and 3.

Figure 6:
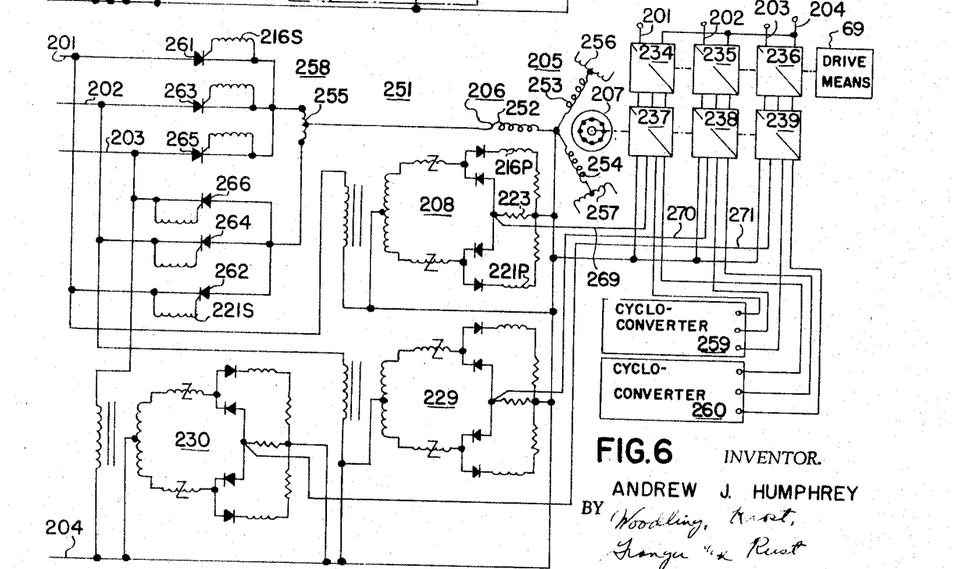

FIGURE 6 shows a motor control circuit 251 which is a three phase input, three phase output circuit of which only one phase of the output is illustrated. This motor control circuit 251 operates from the three phase lines 201, 202 and 203 and the neutral line 204 to energize one phase winding 252 of the three phase stator 206 of the three phase motor 205. The three phase stator winding 206 includes phase windings 253 and 254 as well as the phase winding 252. The phase winding 252 is connected to the center tap of a smoothing choke 255 and the other phase windings 253 and 254 are connected to the center taps of smoothing chokes 256 and 257, respectively.

The motor control circuit 251 includes a cycloconverter 258, 259 and 260 for changing the frequency and the power level from the three phase lines 201-204 to the motor stator 206. Only cycloconverter 258 is shown in detail. This cycloconverter 258 includes six controlled rectifiers 261 to 266, inclusive, for transfer of energy from the three phase lines to the motor winding 252, and the other two phase windings 253 and 254 would have the cycloconverters 259 and 260 connected thereto and to the three phase lines 201-204 in a manner similar to the connection of the cycloconverter 258. The controlled rectifiers 261, 263 and 265 are connected to conduct current from the three phase lines 201, 202 and 203, respectively, to one end terminal of the smoothing choke 255. The three controlled rectifiers 262, 264 and 266 are connected to conduct current from the other end of the smoothing choke 255 to the three phase lines 201, 202 and 203, respectively. The control circuit 208 may be the same as the control circuit 208 in FIGURES 4 and 5 and controls the controlled rectifiers 261 and 262. Control circuits 229 and 230 are also provided and these may be identical to the control circuit 208, with control circuit 229 controlling the controlled rectifiers 263 and 264 and the control circuit 230 controlling the controlled rectifiers 265 and 266.

The means to obtain the control frequency signal for the circuit of FIGURE 6 is similar to the circuit of FIGURE 4. The slip generators 234, 235 and 236 are driven from the low speed drive means 69 and are energized from single phase with each one energized from a different phase of the three phase lines 201–203. The three phase output of the slip generators is again supplied to the pilot generators 237, 238 and 239, respectively, and the diagonal lines on each of these six generators is to indicate that all are wound in the same direction, for phase rotation in the same direction. The pilot generators 237, 238 and 239 each has a three phase output and in this case all three phases of the output voltage are utilized for control purposes. The neutral line 204 is connected to the neutral of the motor winding 206 and is also connected to the neutrals of each of the pilot generators 237, 238 and 239. The first phase winding of the pilot generator 237 is connected by a line 269 to the first control circuit 208 to control the voltage across the control signal resistor 223. Similarly, the first phase windings of the pilot generators 238, 239 are connected by lines 270 and 271, respectively, to the control circuits 229 and 230, respectively, to control the voltage across the control signal resistors therein. The lines 201–204 would be connected to the other two cycloconverters 259 and 260, in a manner not shown, for supplying energy to the stator phase windings 253 and 254. Further, the second phase windings of each of the pilot generators 237, 238 and 239 are connected to the three different control circuits in the cycloconverter 259 energizing the stator phase winding 253. Similarly, the third phase windings of the pilot generators 237, 238 and 239 are connected to the three separate control circuits in the cycloconverter 260 energizing the third phase windings 254.

*Operation*

The operation of the circuit of FIGURE 6 is similar to the operation of the circuit of FIGURE 4. The slip generator 234 has a single phase input which is assumed to be at 60 cycles for this example. The drive means 69 is assumed to be rotating at one cycle per second and the rotor 207 is assumed to be rotating under steady-state conditions at a speed corresponding to 20 cycles per second. The sixy cycle input on the slip generator 234 is therefore transformed into a sixty cycle voltage amplitude modulated at one cycle per second at the output of this generator and upon passing through the pilot generator 237, the voltage is transformed into a sixty cycle voltage in phase with input 201 but with three displaced amplitude modulated phases at a 21 cycle per second rate. Assuming that the first line 201 had the zero degree phase relationship of amplitude modulation, line 202 has 120 degree phase relationship and 203 has a 240 degree phase relationship, it will be noted that the output from the pilot generators 237, 238 and 239 have sixty cycle carriers wherein the pilot generator 237 has a carrier with zero degrees phase relationsip, pilot generator 238 has a carrier with a 120 degree phase relationship and pilot generator 239 has a carrier with a 240 degree phase relationship, all on the first phase winding which is connected to control the cycloconverter 258. The phase of the amplitude modulated wave on each of the three first phase windings of the pilot generators 237, 238 and 239 will be zero degree. The phase on each of the second phase windings of the amplitude modulated signal on each of the pilot generators 237, 238 and 239 will be 120 degrees. The phase on each of the third phase windings of the amplitude modulated signal on each of the three pilot generators 237, 238 and 239 will be 240 degrees. The reason for this difference in the phase connections of the three pilot generators 237, 238 and 239 relative to the phase connections of the circuit of FIGURE 4 is because eighteen controlled rectifiers are to be controlled rather than only six, as in FIGURE 4. An explanation for this difference is perhaps easiest to understand when considering low speed operation of the motor 205. Assume that a speed in accordance with five cycles per second is desired on the rotor 207, this means that a control frequency amplitude modulated at six cycles is required from the pilot generators 237, 238 and 239 so that the cycloconverters can supply pulses of current providing an envelope with a six cycle component to the motor stator winding 206. In each half cycle of the six cycle control frequency voltage, there will be ten half cycles of line voltage. During the positive half cycle of the six cycle component of control voltage, it is desired to have the controlled rectifiers 261, 263 and 265 all firing in sequence from the three phase, 60 cycle lines 201–203 to supply an effective envelope of current pulses from all three rectifiers 261, 263 and 265 which combine to make a single phase half-wave pulse on the motor winding 252. Also, the control voltage during this half cycle of the six cycle component will hold off the firing of the controlled rectifiers 262, 264 and 266. During negative half cycles of the six cycle component of the control voltage, the rectifiers 262, 264 and 266 will be conducting whereas rectifiers 261, 263 and 265 will be blocked from conducting. The cycloconverter sections 259 and 260 supplying the two other motor phase windings 253 and 254 will have control voltages with the carriers displaced 120 degrees plus and minus relative to the 60 cycle carrier supplied to the cycloconverter 258 and this will supply the current for the rotating field on the motor stator winding 206.

Figure 7:
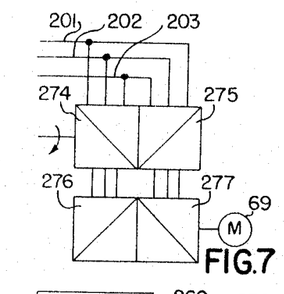

FIGURE 7 shows an alternative means for obtaining the control frequency voltage for the motor control circuit 251 of FIGURE 6. In this circuit of FIGURE 7 pilot generators 274 and 275 are shown, both driven from the main motor rotor 207, not shown in FIGURE 7. The opposite diagonal lines on the pilot generators 274 and 275 indicate that they have opposite phase rotation as indicated by their opposite connection to the three phase lines 201, 202 and 203. These pilot generators have three phase input and three phase output to slip generators 276 and 277, respectively. These slip generators are driven from the slow speed drive means 69 and the opposite diagonal lines on these slip generators indicate they are wound for opposing phases.

Figure 8:
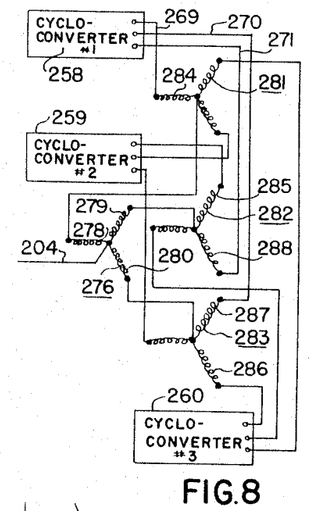

FIGURE 8 better shows the internal winding connections of the slip generators 276 and 277. The slip generator 276 has a single Y-winding with coils 278, 279 and 280. The slip generator 277 has three separate Y-windings 281, 282 and 283. In FIGURE 8, the cycloconverters 258, 259 and 260 are shown for controlling the three separate groups of six controlled rectifiers for a total of eighteen controlled rectifiers in the motor control circuit 251 of FIGURE 6. The neutral line 204 is connected to the center of the Y-winding 276 and for control of the first cycloconverter 258 on the first control line 269, a control voltage is obtained from the winding 278 and a winding 284. This applies a 60 cycle carrier phase of zero degrees and an amplitude modulation phase of zero degrees on this line 269. A signal which is obtained by the series connection of the phase winding 279 and a phase winding 285 in the Y-winding 282, will obtain a signal which has a zero degree 60 cycle carrier phase and a 120 degree amplitude modulation phase and this signal is applied on the first control terminal of the cycloconverter 259. A signal which is obtained from the seris connection of the phase winding 280 and a phase winding 286 of the Y-winding 283 is applied to the first control terminal of the cycloconverter 260 and this is a signal which has a zero degree phase of the 60 cycle carrier and a 240 degree phase of the amplitude modulated signal thereon.

If it be assumed that the direction of phase rotation of the windings in the slip generator 277 have a counterclockwise rotational direction, then this establishes the phase of the carrier signal and the phase of the modulation signal obtained on the remaining two phase windings of each of the Y-windings 281, 282 and 283. Accordingly, the second control terminal of the cycloconverter 258 to which the conductor 270 is attached obtains a control voltage through the series combination of the phase winding 280 and a phase winding 287 of the Y-winding 283. This is a signal which has a 120 degree phase relationship of the 60 cycle carrier and a zero degree phase relationship of the amplitude modulated signal. The signal applied to the third control terminal of the cycloconverter 258 from line 271 is obtained from the series combination of phase winding 279 plus a phase winding 288 of the Y-winding 282. The voltage on this line 271 has a 240 degree phase relationship of the 60 cycle carrier and a zero degree phase relationship of the amplitude modulated signal. The remaining phase windings of the Y-windings 281, 282 and 283 are interconnected with appropriate phase windings of the slip generator 276 to apply the proper phase of carrier and amplitude modulated signals to the cycloconverters 259 and 260.

The FIGURES 7 and 8 show an alternative form of means to obtain a proper set of control voltages of proper phase of carrier and phase of the amplitude modulation to control the motor control circuit 251 of FIGURE 6.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A reversible variable speed drive system operable from an A.C. source comprising, in combination, an induction machine having a polyphase primary winding,
  a frequency changer having a polyphase output connected to said primary winding and having an input connected to said A.C. source,
  first means controlled in accordance with speed of said induction machine to develop a first electrical frequency signal as a function of speed,
  second means independently controlled to develop a second electrical frequency signal at a predetermined low frequency,
  and means to combine said first and second electrical frequency signals alternatively in addition and subtraction to control said frequency changer to produce an output therefrom proportional in frequency to said combined first and second frequency signals to operate said machine at a variable speed as an induction motor and alternatively as an induction generator with said low frequency signal controlling the slip in each case.

2. A variable speed drive system for use with an A.C. source, comprising in combination, an induction dynamoelectric machine having polyphase means,
  a cycloconverter frequency changer having an output and an input connected between said winding means and said A.C. source.
  means developing a first electrical signal derived from the speed of said induction machine,
  a slip generator driven at a slip speed to develop an electrical slip signal,
  and control means to control the frequency of conduction through said frequency changer in response to an amplitude modulated voltage derived from said first and slip signals to operate said induction machine at a slip fixed by said slip signal.

3. A variable speed drive system for use with an A.C. source, comprising in combination, an induction motor having a primary winding,
  a cycloconverter frequency changer having an output connected to said primary winding and having an input connected to said A.C. source,
  means developing a first electrical signal derived from the speed of said induction motor,
  a slip generator independently driven at a slip speed to develop an electrical slip signal.
  control means to control the output frequency of said frequency changer in accordance with an amplitude modulated voltage derived from said first and slip signals to operate said induction motor at a slip fixed by said slip signal,
  and means to control the amplitude of said amplitude modulated voltage to control the torque output and hence speed of said motor.

4. A variable speed drive system operable from an A.C. source of constant frequency comprising, in combination, an induction motor having a polyphase primary winding,
  a frequency changer having a polyphase output connected to said primary winding and having an input connected to said A.C. source,
  first means controlled in accordance with speed of said motor to develop a first electrical signal as a function of motor speed,
  second means independently controlled to develop a second electrical signal at a predetermined low frequency,
  and means to combine the frequencies of said first and second signals to control said frequency changer to produce an output therefrom proportional in frequency to said combined frequencies of said first and second signals.

5. A variable speed drive system for use with an A.C. source, comprising in combination, an induction motor having a primary winding,
  a cycloconverter frequency changer having an output connected to said primary winding and having an input connected to said A.C. source,
  means developing a first signal derived from the speed of said induction motor,
  slip generator means to develop a low speed electrical slip signal,
  and control means including resettable magnetic amplifiers to control the output frequency of said frequency changer in accordance with an amplitude modulated voltage derived from said first and slip signals to operate said induction motor at a slip fixed by said slip signal.

6. The method of controlling the rotor speed of an induction motor, comprising the steps of,
  generating a first electrical signal proportional to the rotational speed of said motor,
  generating a second electrical signal proportional to a controllable low speed,
  combining said first and second electrical signals algebraically to obtain a combined signal proportional to the combined frequencies,
  and controlling the energization frequency of said motor in response to said combined frequency signals.

7. The method according to claim 6, including controlling the amplitude of the energization frequency to control the torque of said motor.

8. The method of externally controlling the rotor speed of an induction motor comprising,
  obtaining a first voltage of a frequency proportional to a desired slip of the rotor, obtaining a second voltage of a frequency proportional to the rotational speed of the rotor, supplying to the stator of an induction motor an energizing voltage whose frequency is directed proportional to the algebraic sum of the frequencies of said first and second voltages, and selectively adjusting the magnitude of the energizing voltage supplied to the stator.

9. A controlled slip system comprising, in combination, an induction motor having stator and rotor members and an input for receiving an energizing voltage for energizing said stator member so that said stator member produces a flux field rotating at a synchronous frequency and induces rotor member rotation at a rotational frequency equal to the synchronous frequency less the slip of the rotor, motor frequency generating means connected to said rotor member and having an output producing electrical control signals at a frequency proportional to the rotational speed of said rotor member, slip frequency generating means having an output producing electrical control signals at a frequency which is proportional to the desired rotor slip, variable frequency supply means having a control signal input and an energizing voltage output, said voltage output producing an energizing voltage of a frequency which is proportional to the frequency of the control signals supplied to the control signal input, first circuit means connecting the energizing voltage output of said variable frequency supply means to the input of said induction motor, and second circuit means connecting the outputs of said motor frequency and slip frequency generating means to the control signal input of said variable frequency supply means to provide said control input with control signals of a frequency which is proportional to the algebraic sum of the slip and motor frequencies.

10. The system of claim 9 including, a variable control signal level controller, means connecting said controller to one of said frequency generating means to selectively adjust the level of the control signals supplied to the control signal input of the variable frequency supply means, and said variable frequency supply means producing at its output an energizing voltage of a level which is proportional to the level of the control signals supplied to said control signal input.

11. A constant slip, variable speed motor system comprising, in combination, a polyphase induction motor having a polyphase stator and input terminals connected to said polyphase stator, a rotor in said motor which is induced to rotate when a polyphase voltage is applied to said input terminals, a cycloconverter having an input for connection to a voltage source of known frequency, polyphase output terminals on said cycloconverter connected to the input terminals of said induction motor, a polyphase control voltage input for said cycloconverter, the output terminals of said cycloconverter producing an energizing voltage having an amplitude and a frequency directly proportional to the amplitude and a frequency component, respectively, of a control voltage applied to its control voltage input, a pilot generator having a rotor operatively connected to the rotor of said induction machine and having a polyphase output producing an output control voltage with a frequency component proportional to the rotation of said induction machine rotor, a slip generator having a rotor operatively rotatable at a predetermined slip frequency and having a polyphase output producing a slip frequency control voltage having a frequency component proportional to the rotational speed of its rotor, at least one of said generators having a polyphase input, first circuit means connecting the output of the other generator to the input of said one of said generators so that the output of said one of said generators provides a control voltage having a frequency component which is the sum of the output frequencies of said pilot and slip generators, and second control circuit means connecting the output of said one of said generators to the control input of said cycloconverter.

12. A controllable slip variable speed motor system comprising, in combination, a squirrel cage induction motor having a polyphase stator, input terminals for connecting said stator to a polyphase voltage source, a rotor in said motor which is induced to rotate when a polyphase voltage is applied to said input terminals, a cycloconverter having an input for connection to an energizing source of known frequency, a polyphase control input on said cycloconverter, a polyphase output connected to the input terminals of said induction motor, the polyphase output of said cycloconverter providing an output voltage proportional to the amplitude and responsive to the frequency carried by a control voltage applied to the polyphase control input of the cycloconverter, a pilot generator having a rotor connected to the induction motor rotor, a single phase rotor winding carried by said pilot generator rotor, a polyphase stator winding on said pilot generator, an adjustable reference voltage selector connected to said rotor winding to energize said rotor winding with an A.C. variable reference voltage, a slip generator having a rotor rotatable at a slip frequency, a polyphase input of said slip generator connected to said stator winding of said pilot generator, and a polyphase output connected to the polyphase input of said cycloconverter, said polyphase output of the slip generator producing a control voltage having a carrier frequency at the frequency of the A.C. variable reference voltage which is amplitude modulated at the sum of the motor and slip frequencies.

13. A variable speed drive, comprising in combination, an induction dynamoelectric machine, a frequency changer having a control input and input and output means interconnecting said machine and an A.C. source, pilot generator means connected to be operated at a speed in direct accordance with the speed of said machine, said pilot generator means having a polyphase output voltage with a frequency component directly in accordance with the speed of said machine.

slip generator means generating a low frequency component polyphase output voltage, means to control said control input of said frequency changer in accordance with the algebraic sum of the output voltages of said generator means to establish an output voltage from said frequency changer with a frequency component at said sum frequency, and voltage control means to control the magnitude of the output voltage of said frequency changer.

14. A variable speed drive, comprising in combination, an induction dynamoelectric machine, a frequency changer having a control input and input and output means interconnecting said machine and an A.C. source, pilot generator means connected to be operated at a speed in direct accordance with the speed of said machine,
said generator means having a polyphase output voltage with a frequency component directly in accordance with the speed of said machine,
slip generator means generating a low frequency component polyphase output voltage,
means to control said control input of said frequency changer in accordance with the algebraic sum of the output voltages of said generator means to establish an output voltage from said frequency changer with a frequency component at said sum frequency,
voltage control means to control the magnitude of the voltage to said control input to control the magnitude of the output voltage of said frequency changer, and feedback control means to control the magnitude of said control input voltage in accordance with speed of said machine.

15. A variable speed drive, comprising in combination, an induction dynamoelectric machine,
a frequency changer having a control input and input and output means interconnecting said machine and an A.C. source,
a pilot generator connected to be driven by said induction machine at a speed in direct accordance therewith,
said pilot generator having a polyphase output voltage with a frequency component directly in accordance with the speed of said machine,
a slip generator driven from a low speed source generating a low frequency component polyphase output voltage,
means to algebraically sum the output voltages of said slip generator and said pilot generator and apply the same to the control input of said frequency changer to establish an output voltage therefrom with a frequency component equal to said algebraic sum to operate said machine,
voltage control means to control the magnitude of at least one of the output voltages of said generators to control the magnitude of the output voltage of said frequency changer,
and feedback control means to control the magnitude of said sum frequency voltage in accordance with torque requirement of said machine.

16. A variable speed drive, comprising in combination, an induction dynamoelectric machine,
a frequency changer having a control input and connecting said machine to a single phase A.C. source,
a pilot generator connected to be driven by said induction machine at the speed thereof,
said pilot generator having a three phase output voltage with a frequency component directly in accordance with the speed of said machine,
a slip generator driven from a low speed source generating a low frequency component three phase output voltage,
means to algebraically sum the output voltages of said slip generator and said pilot generator and apply same to the control input of said frequency changer to establish an output voltage therefrom with a frequency component equal to said algebraic sum to operate said machine,
voltage control means to control the magnitude of the output voltage of one of said generators to control the magnitude of the output voltage of said frequency changer,
and feedback control means to control the magnitude of said sum frequency voltage in accordance with torque requirement of said machine.

17. A cycloconverter variable speed drive, comprising in combination, an induction motor,
a cycloconverter frequency changer having a power input, an output and a control input,
means connecting said power input to a single phase A.C. source,
said output being variable in frequency and magnitude,
means connecting said output to the input of said induction motor for variable frequency energization thereof for variable speed,
a pilot generator connected to be driven by said induction motor at the speed thereof,
said pilot generator having a three phase output voltage with a frequency component directly in accordance with the speed of said motor,
a slip generator driven from a low speed source generating a low frequency component three phase output voltage,
means to sum the output voltages of said slip generator and said pilot generator and apply the same to the control input of said cycloconverter frequency changer to establish an output voltage therefrom with a frequency component equal to said sum to energize said motor for operation at a speed substantially equal to said sum frequency minus said slip frequency,
and voltage control means to control the magnitude of the output voltage of said slip generator to control the magnitude of the output voltage of said cycloconverter to control the torque and operating speed of said motor.

18. A cycloconverter variable speed drive, comprising, in combination, an induction motor,
a cycloconverter frequency changer having a power input, an output and a control input,
means connecting said power input to a single phase 60 cycle source,
said output being variable in frequency and magnitude,
means connecting said output to the input of said induction motor for variable frequency energization thereof for variable speed,
a pilot generator connected to be driven by said induction motor at the speed thereof,
said pilot generator being a synchro having a single phase A.C. 60 cycle input carrier energized from said source and having an output amplitude modulated directly in accordance with the speed of said motor,
a slip generator driven from a low speed source and energized from said amplitude modulated pilot generator output,
means to apply the output voltages of said slip generator to the control input of said cycloconverter frequency changer to establish an output voltage therefrom at a frequency equal to said sum speed and slip frequencies to energize said motor for operation at a speed substantially equal to said sum frequency minus said slip frequency,
voltage control means to control the magnitude of the output voltage of said slip generator to control the magnitude of the output voltage of said cycloconverter to control the torque and speed output of said motor,
and feedback control means to increase the magnitude of said sum frequency voltage in accordance with increase of motor output torque to maintain operation of said motor at substantially constant frequency and slip despite varying loads thereon.

19. A motor control system comprising, in combination, first and second terminals,
means to energize said terminals from a power frequency source,
an induction motor having a polyphase primary winding,
a cycloconverter comprising a plurality of pairs of opposedly connected controlled rectifiers each having control means,
means connecting each of said primary windings through a pair of said controlled rectifiers, respectively, to said terminals,
a pilot generator having a stator and a rotor winding with the rotor winding connected to said variable reference voltage and mechanically driven from said motor,
a slip generator having a stator and a rotor winding,
means connecting the output of one generator to the input of the other generator,
low speed drive means to drive said slip generator rotor at a low speed relative to the frequency of said source,
and means connecting the output of said other of said generators to control the periods of conduction of said controlled rectifiers.

20. A control system for a cycloconverter energized motor comprising, in combination, first and second terminals,
    means to energize said terminals from a power frequency source,
    a squirrel cage induction motor having a three phase stator winding,
    a cycloconverter comprising three pairs of opposedly connected controlled rectifiers each having gate means,
    means connecting each of said stator windings through a pair of said controlled rectifiers, respectively, to said terminals,
    a reference potentiometer connected to a D.C. source,
    a movable blade on said reference potentiometer obtaining a variable reference voltage,
    a pilot generator having a rotor winding mechanically driven from said motor and having a three phase stator,
    a slip generator having a rotor winding connected to said variable reference voltage and having a three phase stator winding connected to said three phase rotor of said pilot generator,
    low speed drive means to drive said slip generator rotor at a slip speed in the order of one cycle per second,
    saturable reactor means connected across said terminals to supply a firing pulse to the gates of said controlled rectifiers,
    a reset impedance and a diode connected in series with said saturable reactor means and with said terminals to supply a reset current to said saturable reactor means on half cycles of polarity opposite to the polarity producing firing pulses,
    and means including a diode connecting the stator winding of said pilot generator to said reset impedance to variably interfere with the reset of said saturable reactor means, whereby said variable reference voltage establishes the speed of operation of said motor and as said variable reference voltage is increased the voltage thereof is represented as an increased amplitude on the output voltage of said pilot generator.

21. A motor control system comprising, in combination, first and second terminals,
    means to energize said terminals from a power frequency source,
    an induction motor having a polyphase primary winding,
    a cycloconverter comprising a plurality of pairs of opposedly connected controlled rectifiers each having control electrode means,
    means connecting each of said primary windings through a pair of said controlled rectifiers, respectively, to said terminals,
    means obtaining a variable reference voltage from said terminals,
    a pilot generator having a rotor connected to said variable reference voltage and mechanically driven from said motor and having a polyphase output on the stator,
    a slip generator having a stator and rotor with one being the input and the other a polyphase output,
    means connecting the output of one generator to the input of the other generator,
    low speed drive means to drive said slip generator rotor at a slip speed in the order of one cycle per second,
    control means connected to supply firing pulses to the control electrode means of said controlled rectifiers,
    impedance means connected in said control means,
    and means including a diode connecting the polyphase output of said other of said generators to said impedance means, whereby said variable reference voltage establishes the speed of operation of said motor and as said variable reference voltage is increased the voltage thereof is represented as an increased amplitude modulation on the combined output voltages of said generators to increase the voltage across said impedance means to increase the output from said controlled rectifiers and increase the speed of said induction motor.

22. A control system for a cycloconverter energized motor comprising, in combination, first and second terminals,
    means to energize said terminals from a power frequency source,
    an induction motor having a polyphase stator winding,
    a cycloconverter comprising a plurality of pairs of opposedly connected controlled rectifiers each having gate means,
    means connecting each of said stator windings through a pair of said controlled rectifiers, respectively, to said terminals,
    means obtaining a variable reference voltage from said terminals,
    a pilot generator having a rotor connected to said variable reference voltage and mechanically driven from said motor and having a polyphase stator,
    a slip generator having a polyphase stator and a polyphase rotor with one being the input and the other the output and with the imput connected to said polyphase stator of said pilot generator,
    low speed drive means to drive said slip generator rotor at a slip speed in the order of one cycle per second,
    magnetic amplifier means connected to supply firing pulses to the gates of said controlled rectifiers,
    reset means connected to said magnetic amplifier means to supply a reset current to said magnetic amplifier means on half cycles of polarity oposite to the polarity producing firing pulses,
    and means connecting the polyphase output of said slip generator to said reset means to variably interfere with the reset of said magnetic amplifier means, whereby said variable reference voltage establishes the speed of operation of said motor and as said variable reference voltage is increased the voltage thereof is represented as a variable carrier voltage, amplitude modulated on the output of said pilot generator at motor operating frequency and said slip frequency adds to the frequency of amplitude modulation of the output voltage of said slip generator to interfere with the reset of said magnetic amplifier means as a function of carrier voltage amplitude thus decreasing the amount of reset and increasing the current flow through said magnetic amplifier means to increase the output from said controlled rectifiers and increase the speed of said induction motor.

23. A control system for a cycloconverter energized motor comprising, in combination, first and second terminals,
    means to energize said terminals from a single phase source,
    a three phase squirrel cage induction motor having a Y-connected three phase stator winding with a neutral, conductor means connecting one terminal to said neutral,
a cycloconverter comprising three pairs of opposedly connected controlled rectifiers each having a gate,
means connecting said second terminal through a pair of said controlled rectifiers, respectively, to the three stator windings,
a reference potentiometer connected across said terminals,
a movable blade on said reference potentiometer obtaining a variable reference voltage,
a pilot generator having a three phase rotor mechanically driven from said motor and having a three phase stator,
a slip generator having a three phase stator connected to said three phase stator of said pilot generator and having a rotor with a single phase winding connected to said variable reference voltage,
low speed drive means to drive said slip generator rotor at a slip speed in the order of one cycle per second,
a saturable reactor connected to the gate of each one of said controlled rectifiers and connected across said terminals to supply a firing pulse to each gate,
a reset resistor and diode connected in series with each said saturable reactor and with said terminals to supply a reset current to said saturable reactors on half cycles of polarity opposite to the polarity producing firing pulses,
and means including diodes connecting the three phase output of said pilot generator rotor to said reset resistors to variably interfere with the reset of said saturable reactors, whereby said variable reference voltage establishes the speed of operation of said motor.

24. A control system for a cycloconverter energized motor comprising, in combination, first, second and third terminals,
means to energize said terminals from a polyphase source,
a squirrel cage induction motor having a polyphase stator winding,
a cycloconverter comprising a plurality of pairs of opposedly connected controlled rectifiers each having control means,
means connecting each of said stator windings through a pair of said controlled rectifiers, respectively, to said terminals,
reference voltage means,
pilot generator means having rotor means and stator means with one being the input and the other being the output,
means to drive said rotor means from said motor,
slip generator means having rotor means and stator means with one being the input and the other the output,
low speed drive means to drive said slip generator rotor means at a slip speed in the order of one cycle per second,
means to connect said reference voltage means to the input of one of said generator means,
means to connect the output of said one of said generator means to the input of the other of said generator means,
and means to control the frequency of said cycloconverter from the output of said other of said generator means.

25. A control system according to claim 24, wherein said slip generator means and said pilot generator means each include three generators,
and wherein only a single phase voltage is utilized from each generator of said pilot generator means.

26. A control system according to claim 24, wherein said slip generator means and said pilot generator means each include two generators,
means to energize said slip generators in opposite phase sequence from a polyphase voltage,
and one of said pilot generators has only a single phase output.

27. A control system according to claim 24, wherein said slip generator means and said pilot generator means each include three generators,
and wherein a polyphase voltage output is obtained from each generator of said pilot generator means.

28. A control system according to claim 24, wherein said slip generator means and said pilot generator means each include two generators,
means to energize said pilot generators in opposite phase sequence from a polyphase voltage,
means to interconnect said pilot and slip generators,
and means to recombine outputs of said slip generators to give amplitude modulated carrier voltages suitable for control of frequency changer means.

29. A control system according to claim 24, wherein said slip generator means and said pilot generator means each include two generators,
means to energize said pilot generators in opposite phase sequence from a polyphase voltage,
and one of said slip generators having three polyphase windings.

References Cited by the Examiner
UNITED STATES PATENTS

| | | | |
|---|---|---|---|
| 1,971,840 | 8/1934 | Willis | 318—72 |
| 2,335,874 | 12/1943 | Moyer et al. | 318—231 X |
| 2,570,651 | 10/1951 | Demuth | 318—231 |
| 2,784,365 | 3/1957 | Fenemore et al. | 318—231 X |
| 3,164,760 | 1/1965 | King | 318—231 X |

ORIS L. RADER, *Primary Examiner.*
G. RUBINSON, *Assistant Examiner.*